(12) United States Patent
Carlton-Foss

(10) Patent No.: US 6,647,373 B1
(45) Date of Patent: Nov. 11, 2003

(54) METHOD AND SYSTEM FOR PROCESSING AND TRANSMITTING ELECTRONIC REVERSE AUCTION INFORMATION

(76) Inventor: John Carlton-Foss, 338 Conant Rd., Weston, MA (US) 02493

( * ) Notice: Subject to any disclaimer, the term of this patent is extended or adjusted under 35 U.S.C. 154(b) by 0 days.

(21) Appl. No.: 09/332,321

(22) Filed: Jun. 14, 1999

Related U.S. Application Data

(60) Provisional application No. 60/113,874, filed on Dec. 27, 1998.

(51) Int. Cl.⁷ .................................................. G06F 17/60
(52) U.S. Cl. ............................................ 705/37; 705/26
(58) Field of Search ............................... 705/37, 26, 27, 705/10, 29, 1, 80

(56) References Cited

U.S. PATENT DOCUMENTS

| | | | | |
|---|---|---|---|---|
| 4,799,156 A | * | 1/1989 | Shavit et al. ................. | 705/26 |
| 4,992,940 A | * | 2/1991 | Dworkin ...................... | 705/26 |
| 5,664,115 A | * | 9/1997 | Fraser ......................... | 705/37 |
| 5,758,328 A | * | 5/1998 | Giovannoli .................. | 705/26 |
| 5,794,207 A | * | 8/1998 | Walker et al. ................ | 705/26 |
| 5,794,219 A | * | 8/1998 | Brown ......................... | 705/37 |
| 5,826,244 A | * | 10/1998 | Huberman .................... | 705/37 |
| 5,835,896 A | * | 11/1998 | Fisher et al. ................. | 705/37 |
| 5,842,178 A | * | 11/1998 | Giovannoli .................. | 705/26 |
| 5,845,265 A | * | 12/1998 | Woolston ..................... | 705/37 |
| 5,890,138 A | * | 3/1999 | Godin et al. .................. | 705/26 |
| 5,897,620 A | | 4/1999 | Walker et al. ................ | 705/5 |
| 5,905,975 A | * | 5/1999 | Ausubel ....................... | 705/37 |
| 5,950,178 A | * | 9/1999 | Borgato ....................... | 705/37 |

(List continued on next page.)

FOREIGN PATENT DOCUMENTS

WO     WO 00/23925     4/2000

OTHER PUBLICATIONS

Cohen, Emily, "Going . . . Going . . . Gone!", PC Magazine, vol. 17, No. 15, p. 40, Sep. 1, 1998.*
Anonymous, "eBay @ $204 Q3 sales, $12.9m ($1.5m)", QL Stock Market Letter, Dialog FIIe 20:Dialog Global Reporter, Dec. 3, 1998.*
Anonymous, "The Wolrd's Personal Trading Community Launches "My eBay!" to Customize the Online Auction Experience", Business Wire, Dialog File 20:Dialog Global Reporter, May 26, 1998.*
Dimitra, DeFotis, "Web Auctions Attracting New Bidders . . . and Scan Artists", Chicago Tribune, Aug. 18, 1998.*
Wilder, Clinton, "What's Your Bid?—FreeMarkets'Real–Time Online Bidding Technology Lets Clients Drive Down Costs and Improve Product Value", Information Week, Issue: 656, Nov. 10, 1997.*
Jahnke, Art, "Purchasing Strategies, How Bazaar", CIO Web Business Magazine, Aug. 1998.*
Buchanan, Leigh, "Seller Door", Inc. Magazine, Sep. 15, 1998.*
Rafter, Michelle, "Reverse Auctions Catching On", The Industry Standard Magazine, Oct. 26, 1998.*
Brack, Ken, "GM Buying Into Online Auctions", Industrial Distribution, vol. 87, Issue 11, Nov. 1998.*
John Carlton–Foss, Internet/WWW Bidding and Ordering Software, Purchasing Today magazine, wand ad section; Aug. Dec. 1997 USA.

*Primary Examiner*—John W. Hayes
(74) *Attorney, Agent, or Firm*—Perkins, Smith & Cohen, LLP; Jacob N. Erlich; Christine M. Kuta

(57) ABSTRACT

In order to conduct an electronic reverse auction, a computer system has a post means for posting product description information across a network, a bidding means for submitting a plurality of bids, proposals, and means for transmitting other information about goods and bidders. A means for evaluating the bids by a select criteria and a security means is also provided.

24 Claims, 17 Drawing Sheets

U.S. PATENT DOCUMENTS

| | | | | |
|---|---|---|---|---|
| 5,966,699 A | * | 10/1999 | Zandi | 705/37 |
| 5,995,947 A | * | 11/1999 | Fraser et al. | 705/37 |
| 6,012,045 A | * | 1/2000 | Barzilai et al. | 705/37 |
| 6,014,644 A | * | 1/2000 | Erickson | 705/37 |
| 6,021,398 A | | 2/2000 | Ausubel | 705/37 |
| 6,023,685 A | * | 2/2000 | Brett et al. | 705/37 |
| 6,023,686 A | * | 2/2000 | Brown | 705/37 |
| 6,026,383 A | * | 2/2000 | Ausubel | 705/37 |
| 6,044,363 A | * | 3/2000 | Mori et al. | 705/37 |
| 6,055,518 A | * | 4/2000 | Franklin et al. | 705/37 |
| 6,058,379 A | * | 5/2000 | Odom et al. | 705/37 |
| 6,058,417 A | * | 5/2000 | Hess et al. | 709/219 |
| 6,216,114 B1 | * | 4/2001 | Alaia et al. | 705/37 |
| 6,230,146 B1 | * | 5/2001 | Alaia et al. | 705/37 |
| 6,230,147 B1 | * | 5/2001 | Alaia et al. | 705/37 |
| 6,260,024 B1 | * | 7/2001 | Shkedy | 705/37 |
| 6,301,574 B1 | * | 10/2001 | Thomas et al. | 705/37 |
| 6,366,891 B1 | * | 4/2002 | Feinberg | 705/37 |
| 6,397,197 B1 | * | 5/2002 | Gindlesperger | 705/37 |
| 6,415,269 B1 | * | 7/2002 | Dinwoodie | 705/37 |

* cited by examiner

Current Requests in the Orb|Bid System:

| Request Number | Open? | Request Type | Bidding Ends | Created | Status |
|---|---|---|---|---|---|
| 25 | Open | RFP | 11/1/98 | 9/29/98 | Open |

Specification:

HARDWARE MINI-SPECIFICATION

The Technology Committee, which was established eight months ago, participated in initiating the conversion of the earlier Macintosh LAN to a Windows NT LAN, and continues to deliberate ways that technology can in the longer term help to achieve the Church's mission. Thus the present Request for Quotations is the continuation of a sequence of anticipated upgrades to the technology systems for the Church. Since it is potentially relevant for structuring of the offer, it should be pointed out that the Church is a non-profit institution so that donations of all or part of the proposed goods and services are eligible for tax credits.

is in the short term seeking to upgrade its current 10-user Windows NT LAN by adding a second Windows NT Server. Upon the completion of this upgrade stage, the LAN will continue to support the existing ten Windows NT clients with the present LAN Server continuing to serve as LAN Server. The new server will become the connection to the Internet with Microsoft IIS installed along with NT, Microsoft e-mail moved from the existing server, and firewall software to isolate the rest of the LAN from the Internet. The strong preference is wherever possible to use packages from the Microsoft BackOffice Small Business Server to provide such capabilities as the firewall.

Category 5 wiring is already in place for the existing LAN. The quotation should include providing a 100 Base-T connection between the servers. Church seeks quotations on the following items at the present time:

- Compaq (or equivalent other) server with 128 MB RAM, or sized to support the proposed software, at least 6GB IDE or SCSI disk with cabling to support a second disk of at least the same size, 16x CD-ROM drive, internal Zip drive and 20 zip cartridges, two 56K internal modems, at least 260 Mhz CPU.

("Compaq" is used above as a placeholder and is not a required brand name. In fact Compaq models with a "sleep" feature will be rejected, and any other computer with a sleep feature must be demonstrated to return from sleep mode without interruption of service. The criterion for acceptability of any hardware and system configuration is that they be of sufficient quality, reputation and maintenance that the software running on existing server will continue to run uninterrupted, and that the church staff will not have to modify its current computer staffing to support the upgraded system. Similarly, it is essential that the provider and maintainer of the hardware systems be capable and willing to work on short notice and well with appropriate software vendors in diagnosing and fixing a problem should there be a failure that reasonably appears to be caused by the hardware systems.)

FIG. 4a

- Microsoft WindowsNT server for ten users installed on the Internet Server, and accessible using the administrative account from the server.

- Microsoft IIS and associated software on the Windows NT installation CD installed on the Internet Server, and accessible using the administrative account from the server. Configuration of the web server to support the site www.trinityboston.org so as to provide a fully functional connection to the ISP through one of the 56K modems.

- Establishment of access for remote system administration and remote web and e-mail administration using RAS or PCAnywhere for WindowsNT and the second modem.

- 10/100 Base-T network cards installed and operational to support connection of the Internet Server PC to the existing Windows NT LAN Server.

- Hookup and testing of the LAN to confirm that it is complete and functioning.

Security is an important condition for this installation. It is not acceptable for hackers to enter the site to review communications or any other information that may be stored on the internal part of the LAN. There are many approaches to establishing security, not all of which could possibly be listed here. The system integrator should propose an approach that it believes will provide the needed security for an acceptable price. There are also other factors such as the requirements for maintenance and personnel time that will influence the choice of a security system. One of the simplest security systems calls for a separate PC to handle e-mail and the connection to the world wide web. With this approach the system integrator may devise reasonable means to provide for transfer of e-mail and blocking off any web or ftp connections from the main LAN. Another approach is to provide a fully installed and configured firewall computer to protect the LAN from intrusions via the Internet. The firewall and proxy server capabilities included in the Microsoft BackOffice Small Business Server represent the preferred approach unless an alternative would provide significantly better security at an acceptable price.

System administration work with WindowsNT to set up a complete and fully functioning WindowsNT LAN with the following user roles: [NT] administrators, backup-only administrators, web-server administrators, e-mail, people with read-write access to editors and html (and other) files used in the maintenance of a web site, access only to end user software packages, access to both financial system and end user software packages, guest to remain as originally set up during the NT installation.

Any other equipment, installation services and training to make a complete and operational system.

Technical service contract beyond the warranty period to assure that the system will never be down more than eight hours.

| Request Number | Open? | Request Type | Bidding Ends | Created | Status |
|---|---|---|---|---|---|
| 26 | Open | RFP | 11/1/98 | 10/1/98 | Open |

| Specification: |
|---|
| Maintenance and Support for Computer System and Internet System: To be inserted soon. |

FIG. 4b

Your Selected Request:

| Open? | Request Number | Request Type | Bidding Ends | Created | Status | Specification |
|-------|----------------|--------------|--------------|---------|--------|---------------|
| Open  | 37             | aaaa         | 12/1/98      | 11/23/98 | Pending | aaaaaaaaaaaaaaaaaaaaaaa |

To add an entirely new bid with a new cover sheet, click on this hot spot.

Add New Bid Cover Sheet

Line Item List of Your Bids for Request #37 Bidder Spotlight

| Category | Product | Bid # | Quantity | $ Total | Drill Down |
|----------|---------|-------|----------|---------|------------|
| Availability | Available two weeks after signing contract. | 69 | 1 | 0 | Edit Item |
| Product | 3 32-bit Hubs, Stackable | 69 | 2 | 2 | Edit Item |
| Configuration | Labor to Implement NT LAN | 70 | 1 | 300 | Edit Item |
| Product | NIC Cards for 21 Computers | 70 | 21 | 1260 | Edit Item |
| Service | Training in Win NT Server and LAN Administration for Two People at any time in classes regularly provided by this VAR. The credits for this course may be exercised at any time by the buyer. | 70 | 2 | 1000 | Edit Item |
| Warranty | Full one year replacement of any failed part (incremental price over 90 day warranty) | 70 | 21 | 840 | Edit Item |
| Product | 21" Monitors Replacing 14" Monitors (incremental price) | 73 | 21 | 21000 | Edit Item |
| Service | 1 hr Response to Replace Failed Computer | 73 | 21 | 2100 | Edit Item |
| Service | 73 | 7 x 24 service | 1 | 15000 | Edit |

FIG. 12a

| Service | 73 | | 7 x 24 service for 1 year | 1 | 15000 | Edit Item |

OrbBID

Add a Line Item for the Displayed Bid

Please complete this form and click on the "Submit Bid Item" button at the bottom.

| Product Description | Product Category | Quantity | $/unit | $ Total |
|---|---|---|---|---|
| | Product ▼ | | | |

List of Available Categories and Their Weights in
Bid Evaluation:

| Request Number | Type | Weight |
|---|---|---|
| 37 | Availability | 6 |
| 37 | Configuration | 10 |
| 37 | Delivery | 5 |
| 37 | Installation | 8 |
| 37 | Other | 4 |
| 37 | Price | 9 |
| 37 | Service | 10 |
| 37 | Warranty | 1 |

| Submit Bid Item! | Clear Form |

Bids Ranked by Percent Fit to Specification

| Req # | Bid # | Status | Date Submitted | Relative Fit |
|---|---|---|---|---|
| 37 | 69 | Pending | 11/23/98 | 0.93% |
| 37 | 70 | Pending | 12/17/98 | 0.24% |

FIG. 12b

Add a Summary Sheet for a New Bid for a Request

Orb | BID BID

Please complete this form and click on the "Submit Bid" button at the bottom.

Request #
| 36 |

Status
| Preliminary Proposal |

Organizational Name
| ABC Corporation |

Date Created
| 12/20/98 |

[ Create Bid Cover Sheet! ] [ Clear Form ]

FIG. 13

Add a Line Item for a Bid

Orb|BID BID

Please complete this form and click on the "Submit Bid Item" button at the bottom.

| Product Description | Product Type | Quantity | $/unit | $ Total |
|---|---|---|---|---|
|  | Product ▼ |  |  |  |

List of Available Categories and Their Weights in Bid Evaluation:

| Request Number | Type | Weight |
|---|---|---|
| 36 | aaaaaaa | 9 |
| 36 | Availability | 6 |
| 36 | Configuration | 10 |
| 36 | Delivery | 5 |
| 36 | Installation | 8 |
| 36 | Other | 4 |
| 36 | Price | 9 |
| 36 | Service | 10 |
| 36 | Warranty | 1 |

[ Submit Bid Item! ] [ Clear Form ]

FIG. 14

Your Selected Request:

| Open? | Request Number | Request Type | Bidding Ends | Created | Status | Specification |
|---|---|---|---|---|---|---|
| Closed | 36 | RFI | 1/1/97 | 4/1/96 | Pending | 100 x Macintosh 720 Computer with 16 MB RAM, 500MB DASD, 150 MHz CPU, 28.8 KBd internal modem, SCSI connector to external R/W CD-ROM, infrared connector, 17" monitor |

Edit Request

---

Bids Ranked by Percent Fit to Specification

| Req # | Bid # | Status | Date Submitted | Supplier | % Fit | |
|---|---|---|---|---|---|---|
| 36 | 22 | Open | 4/1/96 | HIJ Corporation | 64.47% | Review Bid |
| 36 | 61 | Pending | 11/11/98 | Office Depot Inc. | 62.22% | Review Bid |
| 36 | 20 | Open | 5/1/95 | Mailman Industries | 59.41% | Review Bid |
| 36 | 1 | Quote | 4/21/96 6:56:00 PM | Office Depot Inc. | 59.40% | Review Bid |
| 36 | 48 | Pending | 11/3/98 | Office Depot Inc. | 0.21% | Review Bid |
| 36 | 63 | Pending | 11/18/98 | Office Depot Inc. | 0.18% | Review Bid |

---

Orb|Bid Request Matrix for Bid #1

| Request # 36 | Product | Quantity | $ Total |
|---|---|---|---|
| Availability | | | |
| | Now | 100 | 600 |
| Configuration | | | |
| | MS Word for Mcintosh | 100 | 10000 |
| | 8 MB RAM Additional | 100 | 12000 |
| | 500MB DASD replacing 250MB DASD | 100 | 500 |
| | 120 MHz AMD CPU replacing standard 60 MHz processor | 100 | 500 |
| | | | |

FIG. 15

METHOD AND SYSTEM FOR PROCESSING AND TRANSMITTING ELECTRONIC REVERSE AUCTION INFORMATION

CROSS-REFERENCE TO RELATED APPLICATIONS

This application claims priority of U.S. provisional applications Serial. No. 60/113,874 entitled, "Method and System for Processing and Transmitting Electronic Reverse Auction Information" filed Dec. 27, 1998 by the present applicant.

FIELD OF THE INVENTION

This invention relates generally to electronic commerce and more particularly to the conducting of an interactive reverse auction over a computer network.

BACKGROUND OF THE INVENTION

Reverse auctions have traditionally taken the form of the distribution of documents such as a Request for Information, Request for Quotation, Request for Proposal, and/or a Specification to entities that may have an interest in bidding to provide goods and services at a competitive price. In contrast with the typical "forward" auction, the dimensions for selecting a winning bidder are typically not just best price, but include a variety of additional dimensions, such as the brand and quality of the merchandise proposed, the timeliness of delivery, and the quality of service. Furthermore, what is apparently the best offer may not be the eventual winning bid. Further, the requestor of goods and services may elect to select two or more of the top bidders with whom to enter a negotiation. Thus, the winning bidder at the completion of the auction may not be the eventual winner of the business contract, although there are circumstances in which the winning bidder will be the winner of the contract. Finally, while the traditional forward auction has a centralized local point of control through which all initiatives are sourced, the reverse auction may have multiple local and remote sources from which all requests are initiated.

Traditional reverse auctions based on paper media require that formal documents be distributed on paper to prospective bidders, and that those bidders be found and identified for a period long enough prior to the close of the bidding process so that they are able to submit their bids. When a modification is made to a request, an entire round of comunications is required with paper and voice to inform the bidders of the changes. The administrative overhead for setting up and carrying out a "bid" is so great that only complex, "big ticket" goods and services can reasonably be requisitioned using this method.

Some changes in the bidding process have made traditional reverse auctions somewhat more manageable. Requestors often create "short lists" of bidders who are favored because they are known to offer good products and services at acceptable prices, or because they are anticipated to contend for the contract. Telephone, fax, and more recently e-mail have made the processes of communication faster and easier. None of these methods, however, has made it possible to conduct reverse auctions in substantially real time and to evaluate the bids rapidly upon submittal.

Bidding by mail or fax suffers a significant disadvantage for both bidder and requestor compared to bidding in person or by telephone because the mailing or faxing bidder has no chance to improve a bid (i.e. to provide more or better goods and services at a lower cost to the requesting entity) in quick response to competitive bids received from face-to-face or telephone communications. Moreover, although telephone and facsimile bidding allows the bidder to avoid travel expense and inconvenience, traditional auctions may be scheduled at inconvenient times and locations for many remote bidders. This is particularly true for reverse auctions that are conducted internationally. In an international framework, many requestors will not even know how to find prospective qualified bidders using traditional methods. In contrast, the search technologies available on the World Wide Web will allow such bidders to find the requestor auction site if the requestors invest minimal effort to identify themselves and their characteristics to the search engines that are available.

All of these limitations and disadvantages of traditional reverse auction bidding processes, even when bidding by telephone, facsimile or e-mail is permitted, serve to discourage or altogether eliminate a large number of bidders and ultimately cause an increase in selling prices and a decrease in competition to provide the highest reasonable quality and quantity of goods and services, to the economic detriment of both requestor and seller.

A recent innovation in sales has been to use the Internet's World Wide Web facility to post descriptions, often including pictures that depict goods and services, and to show the current pricing for those items. These systems are automated and capable of accepting an order from a customer by having that customer fill out an on-line order form and/or use graphical methods to place items in a "shopping cart." This ordering information is then taken by the system and placed into an on-line order database or accounting system which then completes the order. Such systems, at heart however, sell goods and services only at a fixed price, and do not offer goods and services for competitive bidding and negotiation. Such systems do not dynamically modify prices in an interactive manner in response to bids and other market conditions such as supply and demand.

Another recent innovation in sales has been to use the Internet's World Wide Web facility to post descriptions, in principle including pictures that depict goods and services, and to show the constraints on bidding for those items in a "forward" auction. The auctioneer may own the items directly, or may serve as an agent for the owners of goods and services that are offered. These systems are automated and capable of accepting a bid from a customer by email, by telephone or facsimile, by mail, or by having that customer fill out an on-2line bid form. This bidding information is then taken by the system and placed into a bid database and a winner is selected based on a high bid. Such systems, however, sell only goods and services, that are what the seller wishes to offer, rather than the ones that the requestors wish to request.

Security brokerage firms for years have used automated transaction systems for matching buy and sell orders for securities. For example, NASDAQ's SOES (Small Order Execution System) system offers complete electronic matching of buyers and sellers. This system, however, does not operate an auction. It merely pairs buy orders with sell orders when the pricing criteria of both sides of the trade are met.

It remains desirable to conduct a reverse auction over a computer system.

It is an object of the present invention to provide a method and apparatus to process and transmit electronic reverse auction information.

It is another object of the present invention to provide a method and apparatus to securely receive bids electronically from a plurality of proposers, and to rank the received bids using a plurality of criteria and to electronically provide resulting information to requestors and bidders.

It is another object of the present invention to provide a method and apparatus for conducting a Web-based reverse auction.

SUMMARY OF THE INVENTION

The problems of conducting a reverse auction over a computer network are solved by the present invention of a system for processing and transmitting electronic reverse auction information.

The present invention provides, in a computer network enabling communication between a host computer and a plurality of remote bidders, or between a peer computer and a plurality of peer bidders, a system and method for transmitting and processing reverse auction information implemented as a computer program within the network and the computers on which the program operates, comprising posting means for posting information across the network, the information being descriptive of a request and/or specification of goods and services to be purchased, bidding means available to the bidders for submitting a plurality of proposals across the network in response to the request and/or specification, the bids including financial information, a description of the goods and services to be provided, information about the bidder including one or more pointers to bidder addresses such as an email address and a World Wide Web address, receiving means for receiving the plurality of bids sent across the network by a plurality of proposers, security means for allowing access to only designated request and bid information by those with authorized access, evaluation means for ranking bids received in accordance with financial and an unspecified number of other qualitative and quantitative dimensions, and displaying means for providing relevant information to requestors and to bidders.

The present invention further provides, in a computer network enabling communication between a host computer and a plurality of remote computers, or in a peer computer network enabling communication between one peer computer and a plurality of other peer computers, a reverse auction information and processing system implemented as a computer program within the host and network (or within selected peer or peers and the network) comprising a request and/or specification database in communication with the auction host computer system for storing information about requests and/or specifications, such information being descriptive of a request and/or specification of goods and services to be purchased, a bid database in communication with the auction host computer system for storing information about responses to requests and/or specifications, such bids including (but not limited to) financial information, a description of the goods and services to be provided, information about the bidder including one or more pointers to bidder addresses such as an email address and a World Wide Web address, a reverse auction engine in communication with the request database and the bid database, and a security manager that allows requestors to designate whether a request shall be generally available and to designate the parties who shall have access to bid on it, and a Display System that displays selected information from the request database and the bid database to appropriate requestors and bidders so that the bidders are encouraged to compete in an open marketplace and the requestors may witness the bidding and alter the environment of that bidding before and during the time of the competitive bidding process.

A primary advantage of this system is that it results in greater value for requestors, as well as greater sales and broader distribution for sellers who are prepared to be competitive in their offerings. By incorporating an auction format which is available to a wide audience by electronic means, the inventive system results in more bidders, greater response, and hence lower costs and greater value for the requestor. Because this electronic system reaches a geographically diverse audience, requests become visible in areas where they are not ordinarily available for suppliers to notice them and respond to a request, resulting in increased supplier response without significant increase in purchasing costs. As general knowledge of the requisition site grows, business grows. Furthermore, the electronic auction system is substantially automatic, requiring personnel only to negotiate if such is required as an additional process after the winners are determined, to establish the conditions under which each particular reverse auction will be operated and evaluated, and to review and modify the qualitative judgments made by the auction engine in evaluating proposals. Therefore, many suppliers can concurrently respond to a multiplicity of requests, thus providing a dramatic reduction in costs associated with operating a procurement effort in a reverse auction format. Indeed, it would not be possible to operate an equivalent twenty-four hour per day, seven-day per week procurement auction with an unlimited number of requests and potentially thousands if not millions of proposers without such an inventive electronic reverse auction method and system.

The present invention together with the above and other advantages may best be understood from the following detailed description of the embodiments of the invention illustrated in the drawings, wherein:

BRIEF DESCRIPTION OF THE DRAWINGS

FIG. 4a is a sample worksheet for bidders to review bid proposal requests according to principles of the invention;

FIG. 4b is a continuation of FIG. 3a;

FIG. 12a shows a bidder worksheet for displaying request information and a proposer's bid information according to principles of the present invention;

FIG. 12b is a continuation of FIG. 12a;

FIG. 13 shows a bid cover sheet for entering and displaying a single proposer's background information for a bid proposal according to principles of the present invention;

FIG. 14 shows a bid line item screen for entering and displaying a single line item for a bid proposal according to principles of the present invention; and, FIG. 15 shows a sample worksheet for requestors to review requests and bids according to principles of the present invention.

DETAILED DESCRIPTION OF PREFERRED EMBODIMENTS

Figure 1:
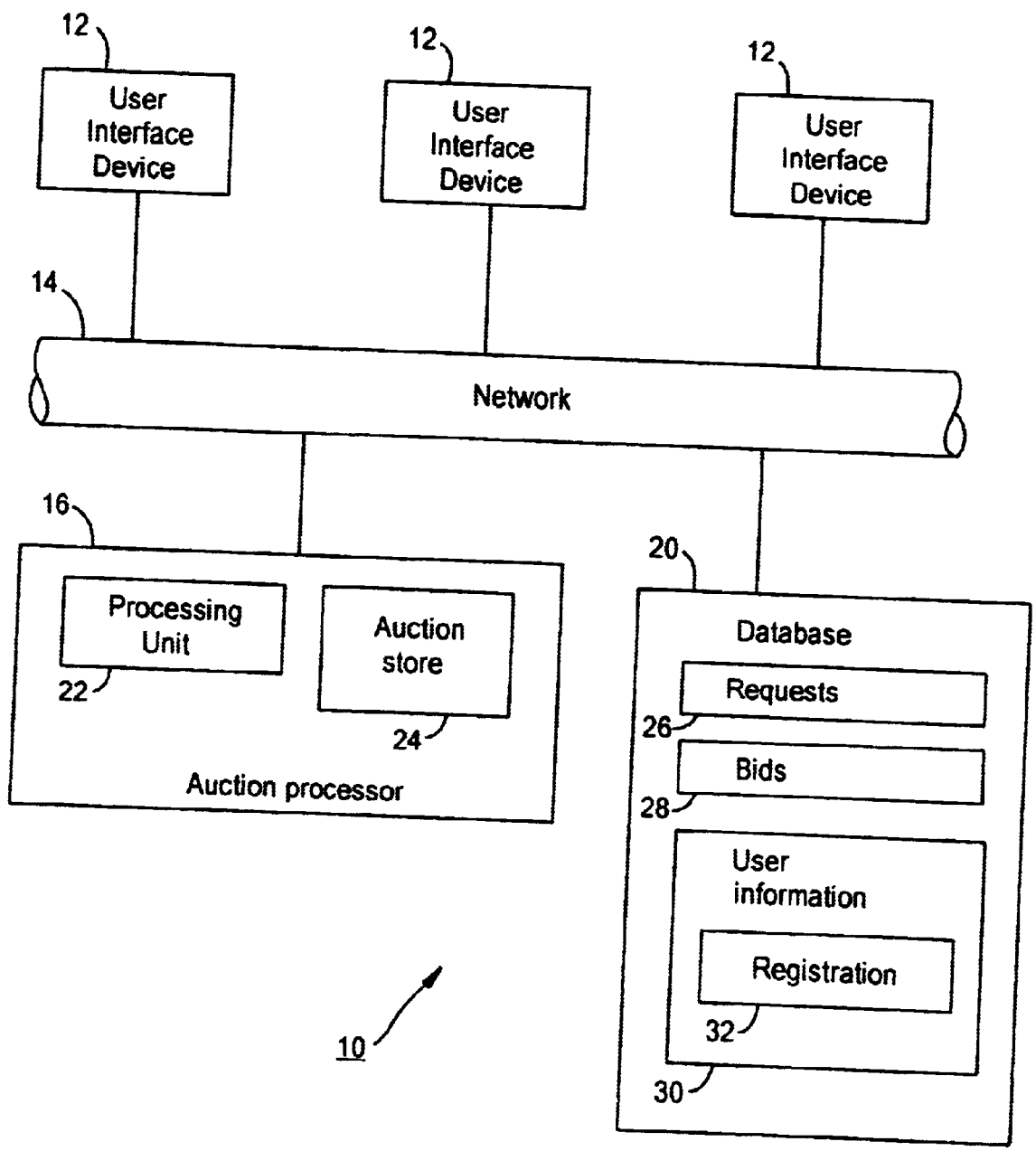
FIG. 1 is a block diagram of a reverse auction system according to principles of the present invention.

FIG. 1 is a block diagram of a reverse auction system 10 for conducting a multi-requestor, multi-bidder reverse auction with minimized or no use of a human auctioneer to conduct the auction. The reverse auction system 10 allows possibly overlapping groups of requestors and bidders to interactively place requests and bid proposals over a computer or communications network, automatically records the requests and the bid proposals, updates requestors and bidders interactively with current auction status information, allows requestors and bidders to interactively modify their requests and bids, closes each auction from further bidding when appropriate, and provides on-line feedback to requestors and bidders of the numerical rating of each bid on any request specification.

The reverse auction system 10 includes a plurality of user interface devices 12, a network 14, an auction processor 16 and a database system 20. The user interface devices 12 are for bidders and requestors to make bids and requests. The user interface devices 12 may be any devices with input and output capabilities which allow a user of the system to communicate with a computer network including a terminal, or a personal computer. The network 14 may be any type of computer network including a private network such as a corporate intranet or a public network such as the World Wide Web. The auction processor 16 includes a processing unit 22 and an auction store 24 for storing the auction templates and other reverse auction system information. The database system 20 stores information about requests 26, bids 28 on those requests, users and their security information 30 for the reverse auction system 10, security information about who has permission to view which requests, and other relevant information. The database system 20 may be any one of many commercially available database management systems. Inside the database system 20, there is a bid database 28, a request database 26, and a user database 30 with a registration database 32. More databases may be added in alternative embodiments. The auction system 10 may be configured in other ways. For example, the auction processor 16 and database system 20 may be in the same computer, or alternatively, the various modules of the reverse auction system may have distributed components separately connected to the network. Also, in alternative embodiments, the database system 20 may be reconfigured, separating or combining the modules in configurations other than that shown in FIG. 1.

Once requestors have loaded the request database 26 with information about their requests, they can indicate that a request summary is ready for display to all potential bidders, or to a specified list of bidders. FIG. 15 shows a sample worksheet for requestors to review requests and bids. The reverse auction system 10 takes the information in the request database 26 and transforms it into a human readable format for viewing. Bidders are then able to view the request and submit proposals or other responses. The human readable presentation of a request preferably contains key identifying information such as the identification of the requestor and the deadline for submitting bids. The time the request is submitted is automatically stamped in its database record by the system.

The reverse auction system 10 takes the information in the bid database 28, performs calculations, and transforms it into a human readable format for viewing at the user interface devices 12. Requestors are able to view the bids on their requests in order to monitor the progress of the auction, and to select zero or more winning proposals. Authorized bidders are able to view selected parts of the bids and respond with revised proposals. The human readable presentation of a bid preferably contains an electronic cover sheet with key identifying information such as the identification of the bidder, a picture of the proposed product uploaded to the database, pointers to the bidders' World Wide Web pages, and the date for submitting the bid. It also includes as many line items as may be required to represent the proposal and pricing being offered. The time the bid is received is automatically stamped in its database record by the system.

Upon accessing a public or private network and entering the part of the system that displays new requests on which the supplier is invited to submit a proposal, the bidder may perform a mouse click on a URL hot spot to display an electronic bid cover sheet. After completing the cover sheet, and storing the information by clicking on a submit button, bidders can click on another hot spot to begin entering as many line items as required to complete the bid. After storing the cover sheet or any line item entry, the bidder may modify it by clicking on another hot spot, modify the information, and store the changes by clicking on a submit button on the screen. Performing all of these operations on a single screen would not change the fundamental nature of the invention.

The reverse auction system 10 receives the bid information and stores it in the bid database 28. This new or modified bid will cause new or modified information to be displayed on the requestor worksheet and the bidder worksheet described below, whether the bid is competitive or not competitive with other existing bids. The unchanged information is also displayed. Typically only the percent fit, or equivalent rating, of the bids to the request are displayed to all bidders while the associated bidders are not identified to other bidders. There may be auctions, however, in which the bidders are identified along with their bids. Typically the requestors will view the bidders who are associated with each bid and its evaluation, although there may be auctions in which the requestors are kept blind to the identities of the bidders.

After the closing of a bid process, the maker of the request with respect to which the bids were submitted reviews the bids and makes a determination as to which potential supplier or suppliers will be identified as the winners of the bid process. The ratings of the bids are based on the evaluation dimensions identified by the requestor. If, in the extreme, a single winner is determined solely on a quantitative financial dimension of lowest bid, then the requestor and all bidders will know the winner through the interactive displays on the requestor worksheet and the bidder worksheet described below. If, in the opposite extreme, a multiplicity of auction winners are selected for negotiation and multiple sourcing of requested items, then the requestor and all bidders will know the leading candidates through the interactive displays on the requestor worksheet and the bidder worksheet described below.

Figure 2:
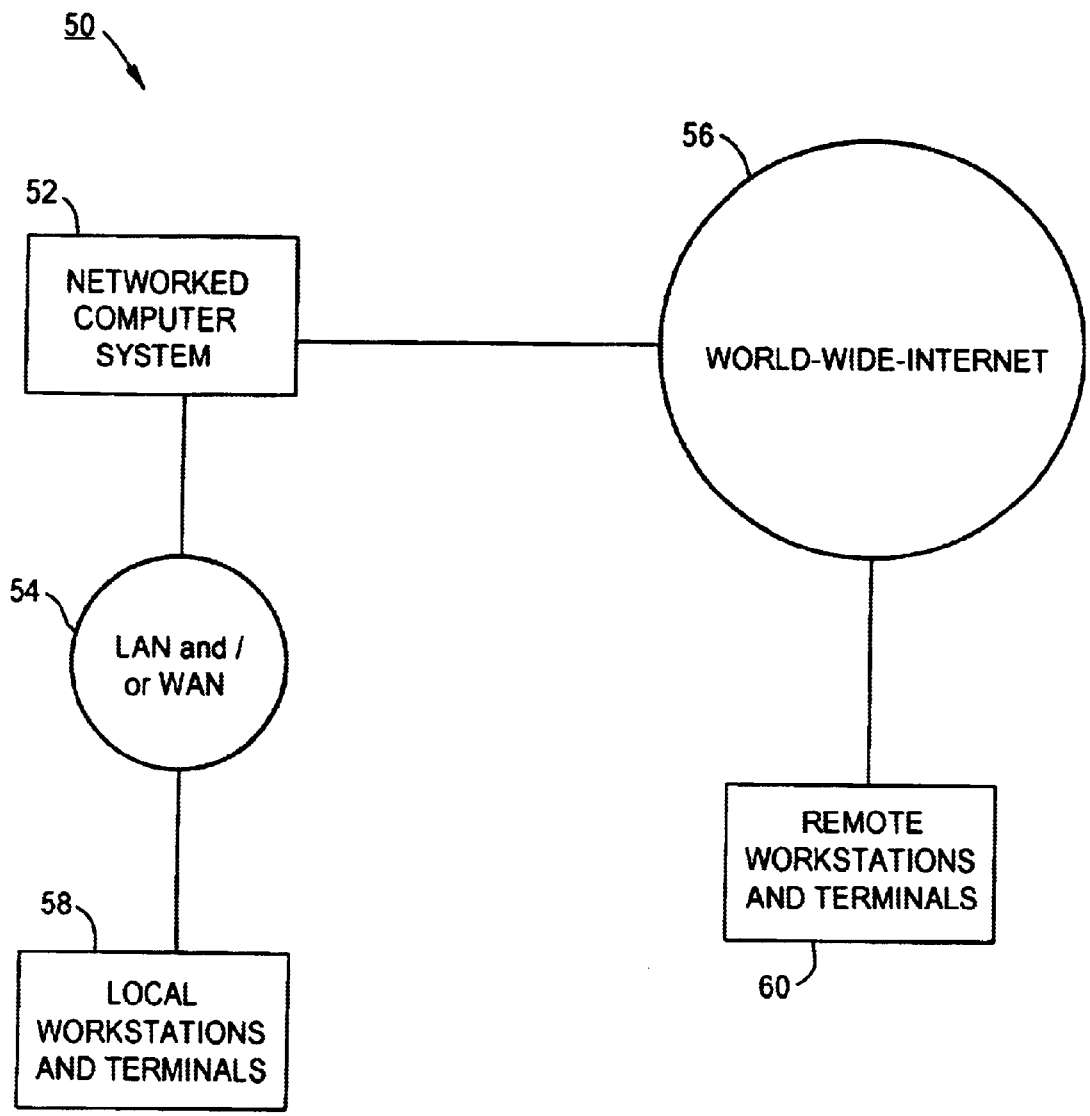
FIG. 2 is a schematic diagram of a first computer environment having an electronic reverse auction system according to principles of the invention.

FIG. 2 shows a first computer environment 50 having the reverse auction system 10. The present system is preferably implemented as a computer program running on a server host which may be comprised of one or more computers 52 or a networked computer system attached to a wide area internal network 54 and/or to the Internet 56 accessible by many requestors through local workstations or terminals 58, and potential proposers or bidders through remote workstations or terminals 60. A preferred wide area network for implementing the present invention is the Internet, which is accessible by a significant percent of the world's business population. The network could also be a local area network, an Intranet, or a network with limited access.

Figure 3:
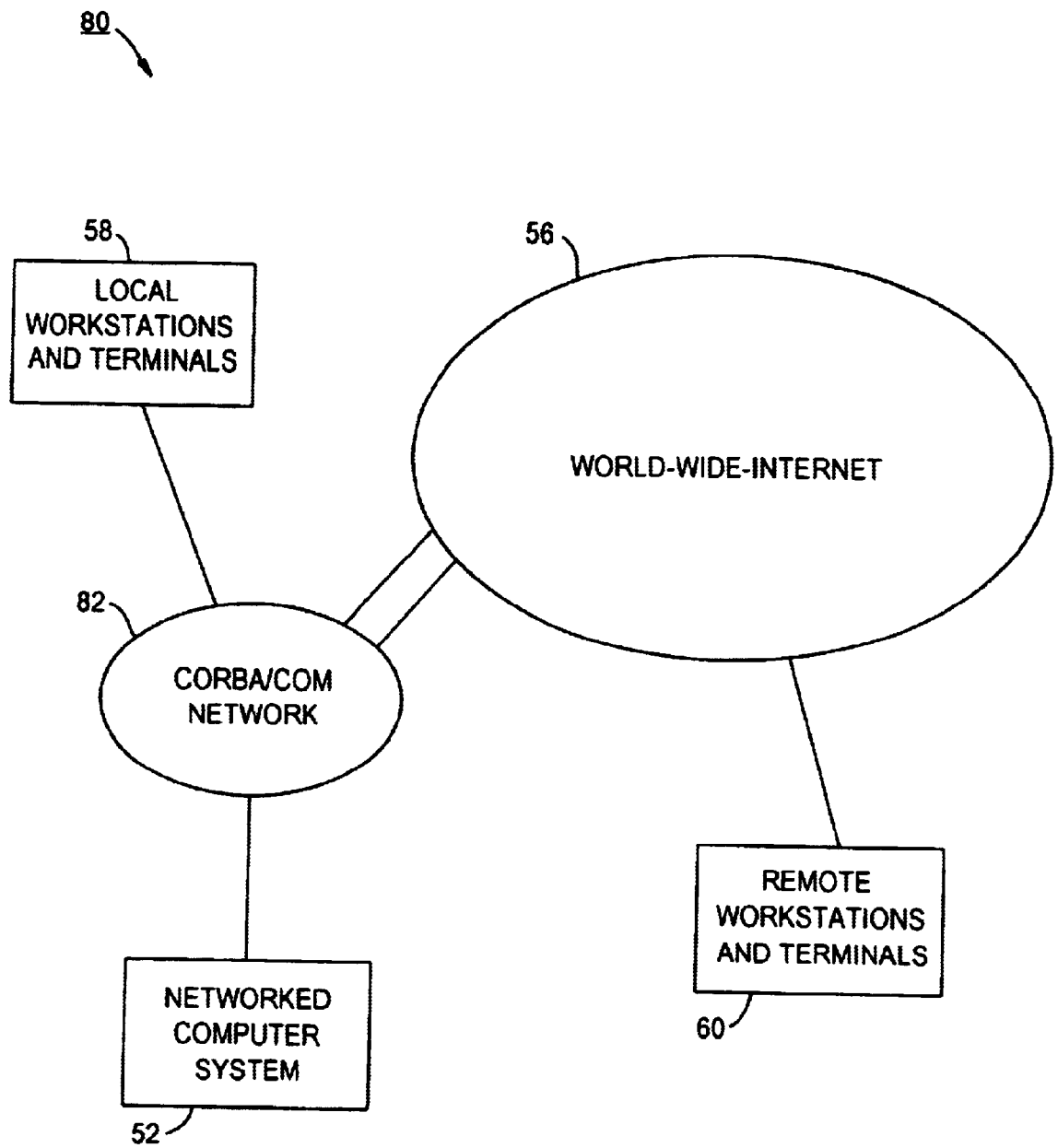
FIG. 3 is a schematic diagram of a second computer environment having a reverse auction system according to principles of the invention.

FIG. 3 shows a second computer environment 80 having the reverse auction system 10. In FIG. 3, a plurality of computers 52 form the server host. The host computers 52 are connected through a CORBA/COM network 82 to local workstations or terminals 58 and the Internet 56.

Figure 5:
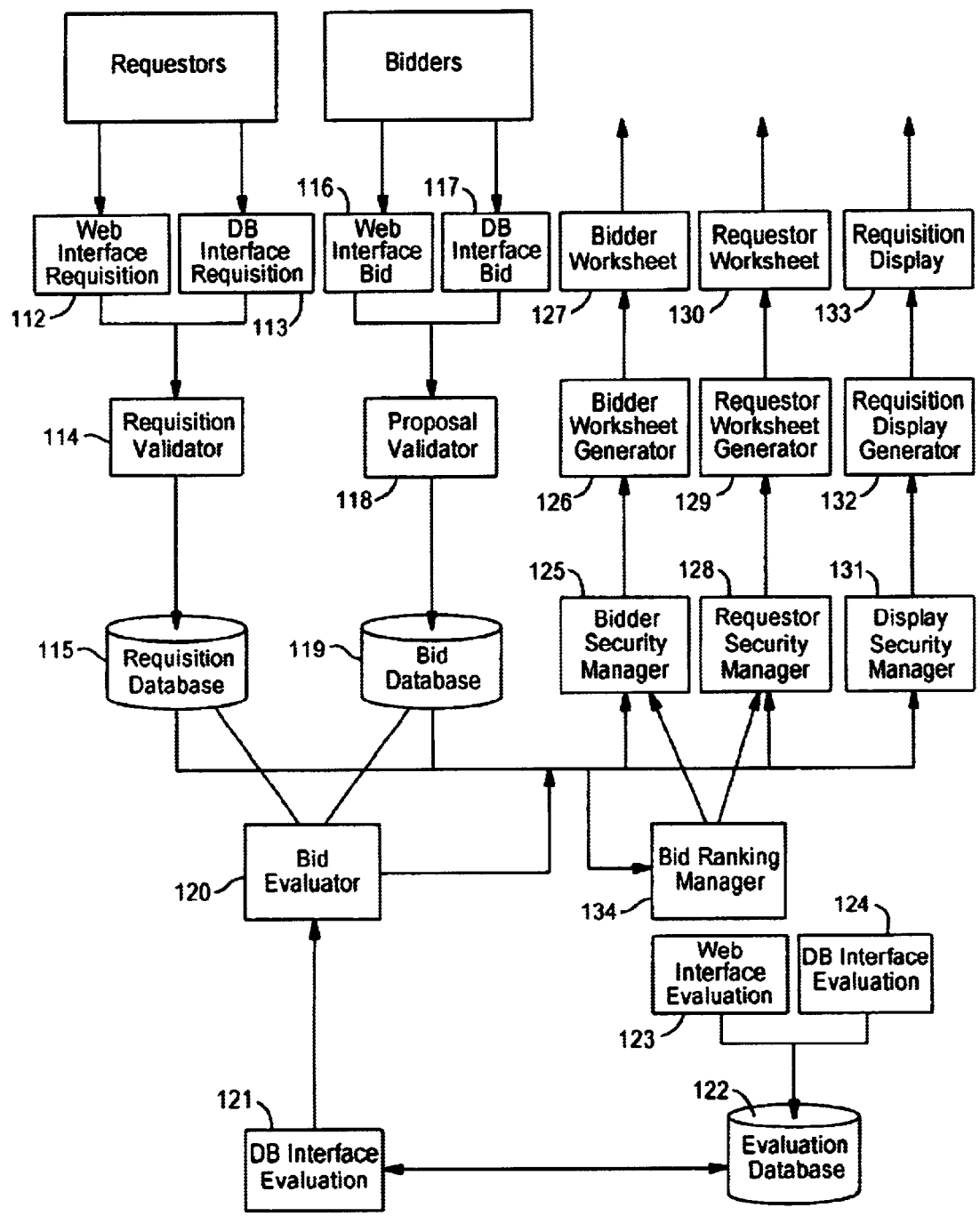
FIG. 5 is block diagram of the components of the electronic reverse auction system according to principles of the present invention.

Potential suppliers are presented at their computer screens with requisition specifications such as the one shown in FIGS. 4a and 4b, generated by the bidder worksheet generator 126 (FIG. 5). Each bidder worksheet allows the bidder to return to the previous screen, a summary listing of all the currently active and applicable requests, from which the bidder can click on a hot spot to display any of those requests in the bidder worksheet screen format, and place bids using keyboard and pointing device.

FIG. 5 is a high level block diagram of the electronic auction system of the present invention, in more detail than in FIG. 1. As shown, request data is received at a first input/output interface such as a World Wide Web interface 112 or from an interactive database user interface 113 or from a database import facility (not shown) where it is processed by the requisition validator 114. The requisition validator 114 examines the request data, or requisition, received from the requestor to assure that the requisition is properly formatted, that all necessary data is entered and that it is of the correct type (e.g., numerical, date, text). Depending on the detailed purpose for which an instance of the invention is implemented, exemplary functions of the request validator may include verifying state abbreviation and zip code, verifying credit card information, confirming that the credit card is valid, and that organizational information and a telephone number and facsimile number have been entered. Once the request data has been validated, the requisition validator 114 places the request in the requisition database 115.

As shown further in FIG. 5, bid data is received from a second input/output interface such as a second World Wide Web interface 116 or from a second interactive database user interface 117 or from a second database import facility (not shown) where it is processed by the proposal validator 118. The proposal validator examines the bid data received from a proposer to assure that the bid is properly formatted, that all necessary data is entered and that it is of the correct type (e.g., numerical, date, financial, text). Depending on the detailed purpose for which an instance of the invention is implemented, exemplary functions of the request validator may include verifying state abbreviation and zip code, and that organizational information of the proposing party have been entered. Once the request information has been validated, the proposal validator 118 places the request in the bid database 119.

The bid item evaluator 120, triggered automatically by the insertion or update of a record in the bid database 119 or manually from the bidder worksheet or manually from the requestor worksheet or manually from the database (DB) interface of the auction manager's console, matches descriptions of goods and services with entries in the evaluation database 122 to rate the quality of proposed goods and services, or in general to provide quantitative numerical evaluations of non-numerical attributes of line items in bids. The bid item evaluator 120 receives information from the evaluation database 122 through a database interface 121. The bid item evaluator 120 determines a value for each bid item based on the match of information found in the bid item data with information found in the reference data base 122.

The database (DB) interface 121 to the evaluation results of the evaluation database 122 allows a team of experts to review the automated evaluation for accuracy and correctness, and to place an evaluation for items that were not addressed by entries in the evaluation database 122. Authorized personnel make inserts, updates and deletes in the evaluation database 122 using the Web interface for the evaluation database 123 and the database interface for the evaluation database 124. The output of the bid item evaluator and manual modifications serves as part of the input for the bid ranking manager 134. Triggered automatically whenever there is a request for information about the ratings of bids for a requisition, the bid ranking manager 134 calculates the numerical percentage "goodness of match" of the proposed line items to the requisition.

The process of the bidder security manager 125 is described below in the discussion of FIG. 9. The bidder worksheet generator generates a web page or user interface screen comprising the bidder worksheet 127. The requestor security manager 128 is described below in the discussion of FIG. 8. The requestor worksheet generator 129 generates a web page or user interface screen comprising the requestor worksheet 130. The display security manager 131 is described below in the discussion of FIG. 10. The requisition display generator 132 generates a web page or non-interactive user interface screen comprising the public requisition display 133. The process of the bid ranking manager 134 is described below in the discussion of FIG. 11.

Figure 6:
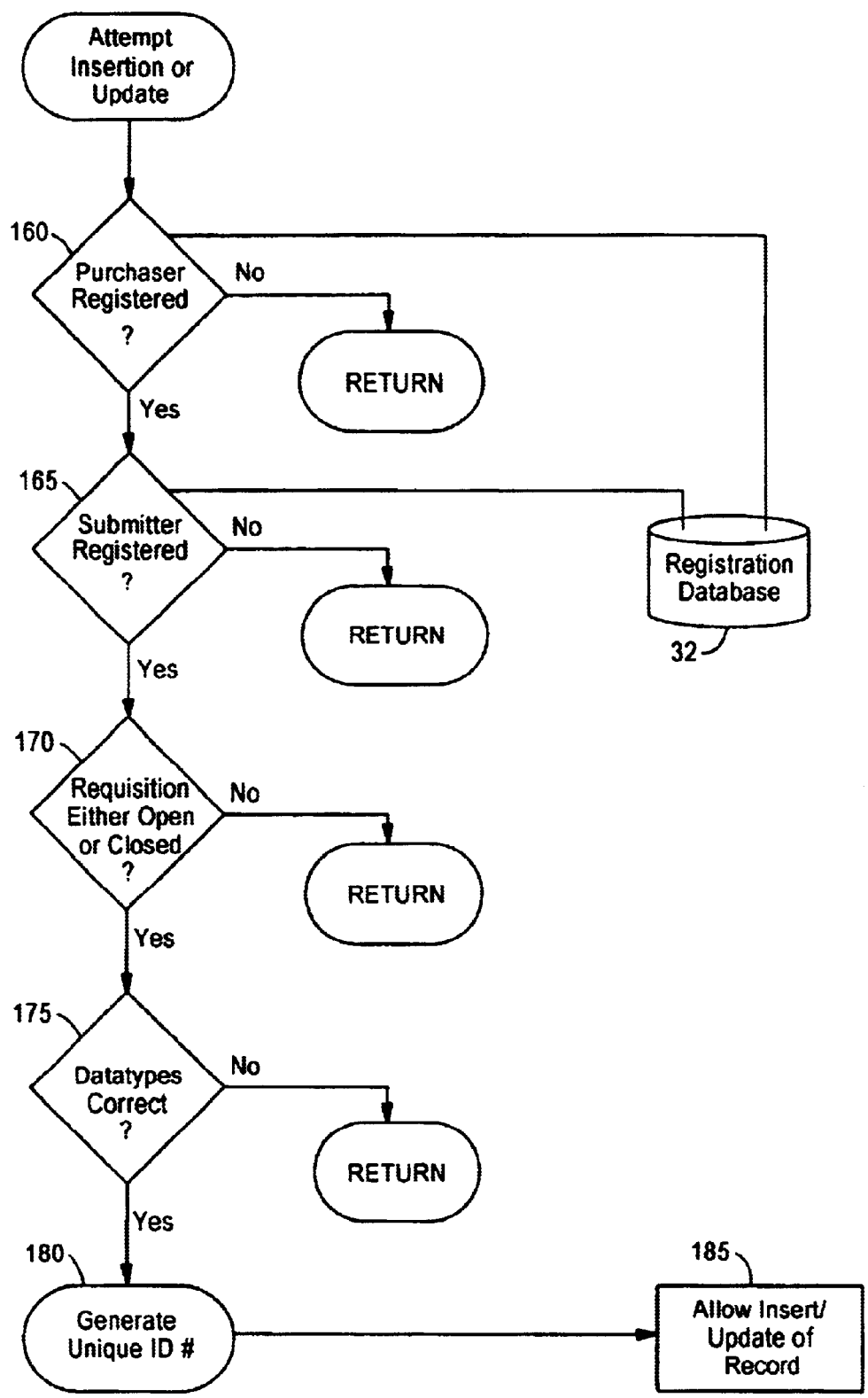
FIG. 6 is a flow chart of the method of operation of the request record access security manager and validator according to principles of the present invention.

FIG. 6 (viewed in conjunction with FIGS. 1 and 5) illustrates in detail the procedure for request validation as accomplished by the requisition validator 114 shown in FIG. 5. A requisition is received by the requisition validator 114 and the requestor is looked up at step 160 in the registration database 32 (FIG. 1). If no registration record exists for the requestor, then the requisition submittal is rejected and the requestor must either terminate the submittal and register or modify the submittal to match a bona fide entry in the registration database 32.

From there, the submitter, whether this is the requestor or the entity that the requestor represents, is looked up at step 165 in the registration database 32. If no registration record exists for the submitter, then the requisition submittal is rejected and the requestor must either terminate the submittal and register or modify the submittal to match a bona fide entry in the registration database 32. From there the requisition validator 114 verifies in step 170 that the status of the requisition is either open or closed. If the value of the status is neither, then the submittal is rejected, and the requestor may terminate the submittal or correct the value and resubmit. From there, the requisition validator verifies in step 175 that all datatypes are valid and correct. The date information must be in valid date format, numerical information must be in numerals, currency information must be monetary, and textual information must fit within the allotted space. If one or more of these conditions are violated, the submittal is rejected and the requestor may terminate the submittal or correct the value and resubmit. Once all verifications have been passed, the requisition validator 114 in step 180 automatically generates a unique identification number for the requisition and then in step 185 allows the insertion of the new record, or if the operation is an update, then bypasses step 180 and in step 185 allows the update of the existing record.

Figure 7:
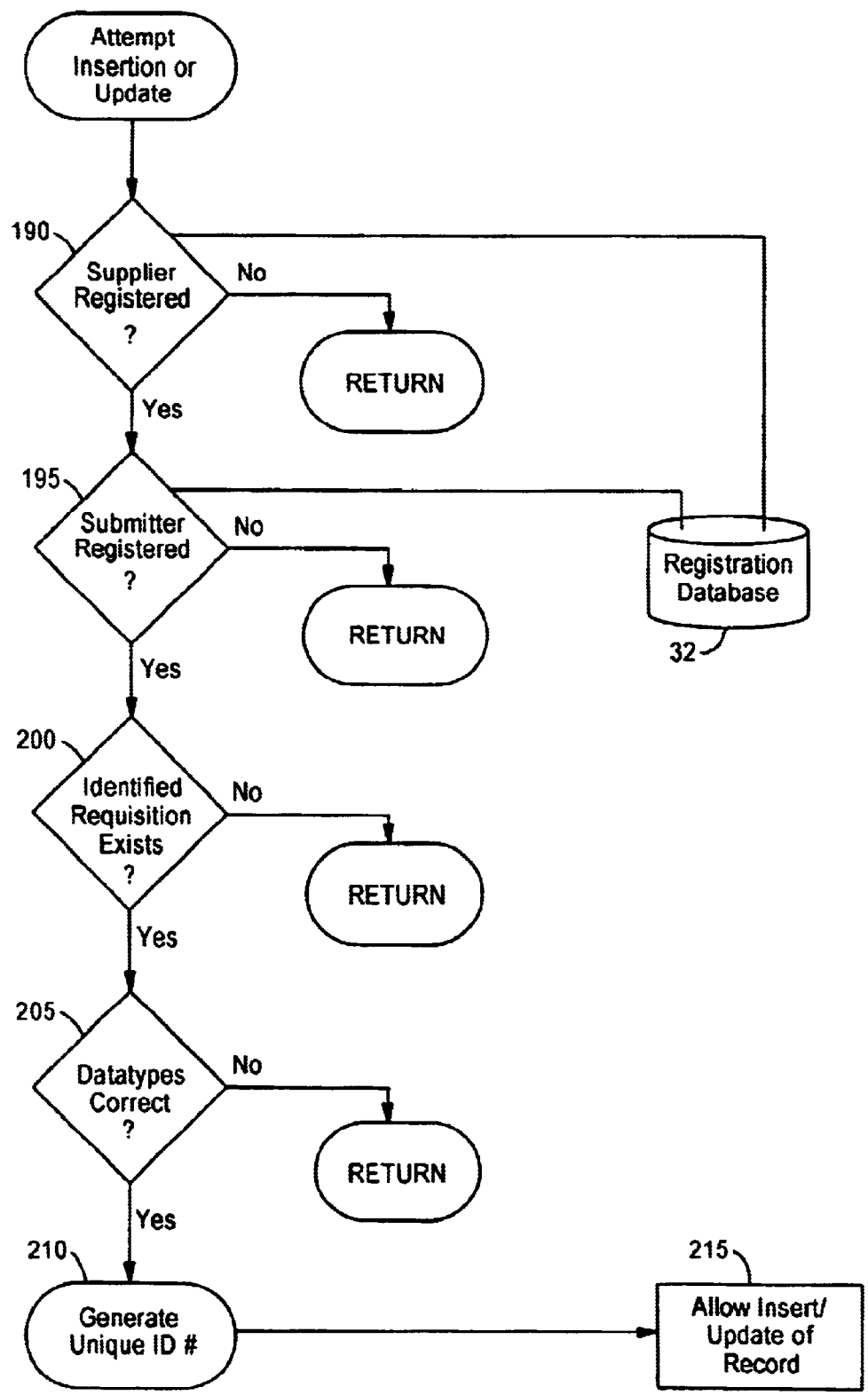
FIG. 7 is a flow chart of the method of operation of the bid record access security manager and validator according to principles of the present invention.

FIG. 7 (viewed in conjunction with FIG. 5) illustrates in detail the procedure for proposal validation as accomplished by the proposal validator 118 (FIG. 5). A proposal is received by the proposal validator 118 and the supplier is looked up at step 190 in the registration database 32. If no registration record exists for the supplier, then the proposal submittal is rejected and the bidder must either terminate the submittal and register or modify the submittal to match a bona fide entry in the registration database 32. From there, the submitter, whether this is the bidder or the entity that the bidder represents, is looked up at step 195 in the registration database 32. If no registration record exists for the submitter, then the proposal submittal is rejected and the bidder must either terminate the submittal and register or modify the submittal to match a bona fide entry in the registration database 32. From there the proposal validator 118 verifies in step 200 that the requisition addressed by the bid exists. If the requisition does not exist, then the submittal is rejected, and the requestor may terminate the submittal or correct the value and resubmit. From there the proposal validator 118 verifies in step 205 that all datatypes are valid and correct. The date information must be in valid date format, numerical information must be in numerals, currency information must be monetary format, and textual information must fit within the allotted space. If one or more of these conditions are violated, the submittal is rejected and the bidder may terminate the submittal or correct the value and resubmit. Once all verifications have been passed, the proposal validator 118 in step 210 automatically generates a unique identification number for the bid and then in step 215 allows the insertion of the new record, or if the operation is an update, then bypasses step 210 and in step 215 allows the update of the existing record.

Figure 8:
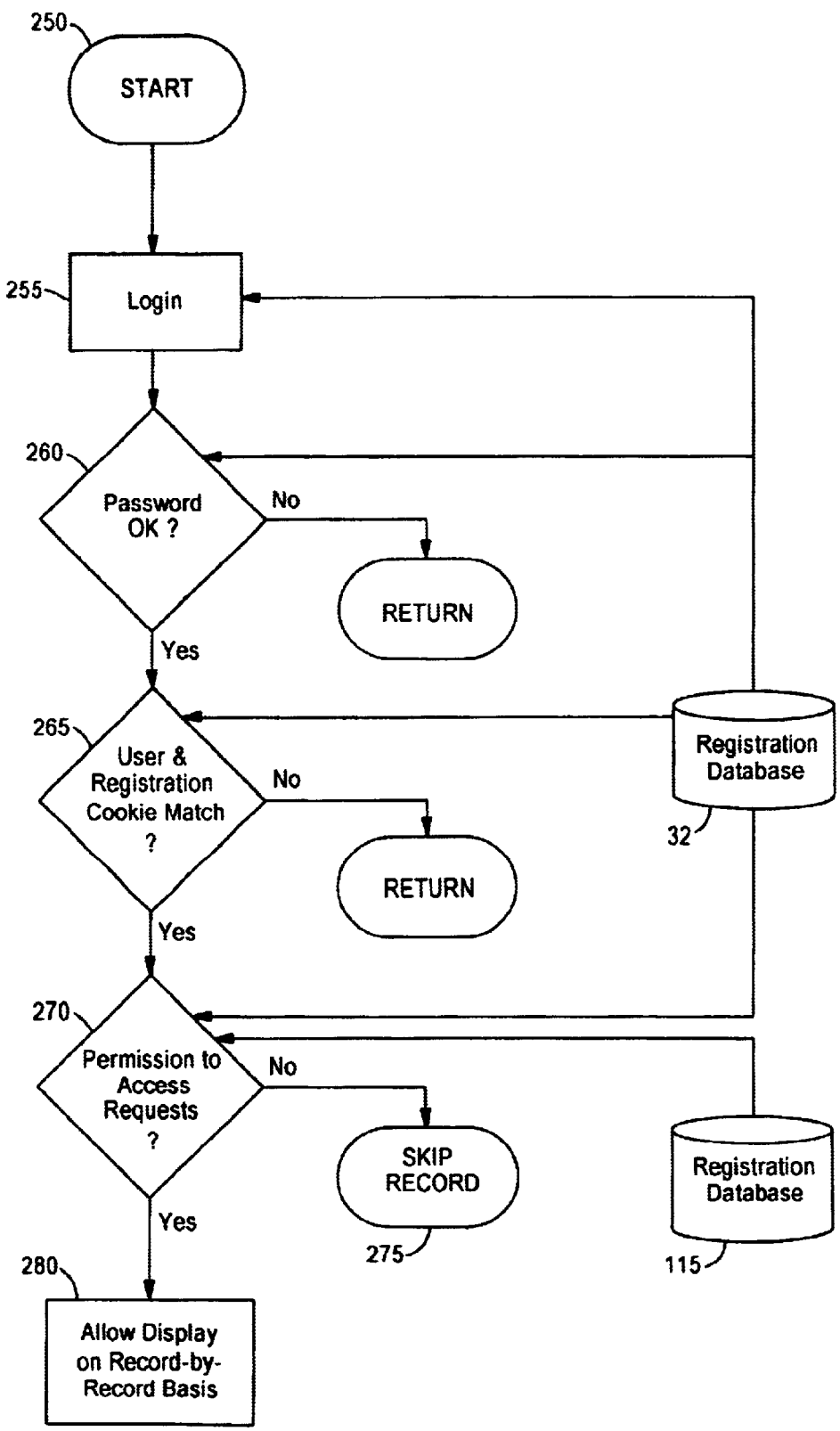
FIG. 8 is a flow chart of the method of operation of the request record display security manager according to principles of the present invention.

FIG. 8 (viewed in conjunction with FIG. 5) illustrates in detail the procedures carried out by the requestor security manager 128 (FIG. 5). When a requestor wishes to submit, review, or revise a request and associated bids, the requestor security manager 128 executes the sequence of steps detailed in FIG. 8. The user logs on in step 255 to the system with a unique user identification and a password, which are validated against the registration database 32. If in step 260, the user identification and password do not match those in the registration database 32, the user is sent back to the logon screen to try again for a maximum of four tries before being ejected from the system. The exact number of tries allowed before a user is rejected is arbitrary and may be set to any number. If the user identification and password match those in the registration database 32, the requestor security manager 128 proceeds to the next step. In step 265, a cookie stored on the user's computer is checked against information stored in the registration database 32. If the cookie does not match in step 265 with that in the registration database 32, the user is rejected and must call the system administrator to negotiate entry into the system. The auction administrator is able to change the users' designated cookies using a privileged interface. From there the requestor security manager 128 identifies the requisitions and associated proposals to which the requestor is granted access, and then passes only those requisitions and associated information along to the requestor worksheet generator 129, which generates a web page or user interface screen comprising the requestor worksheet 130. The above-described process of system security can be eliminated without changing the fundamental nature of the invention.

Figure 9:
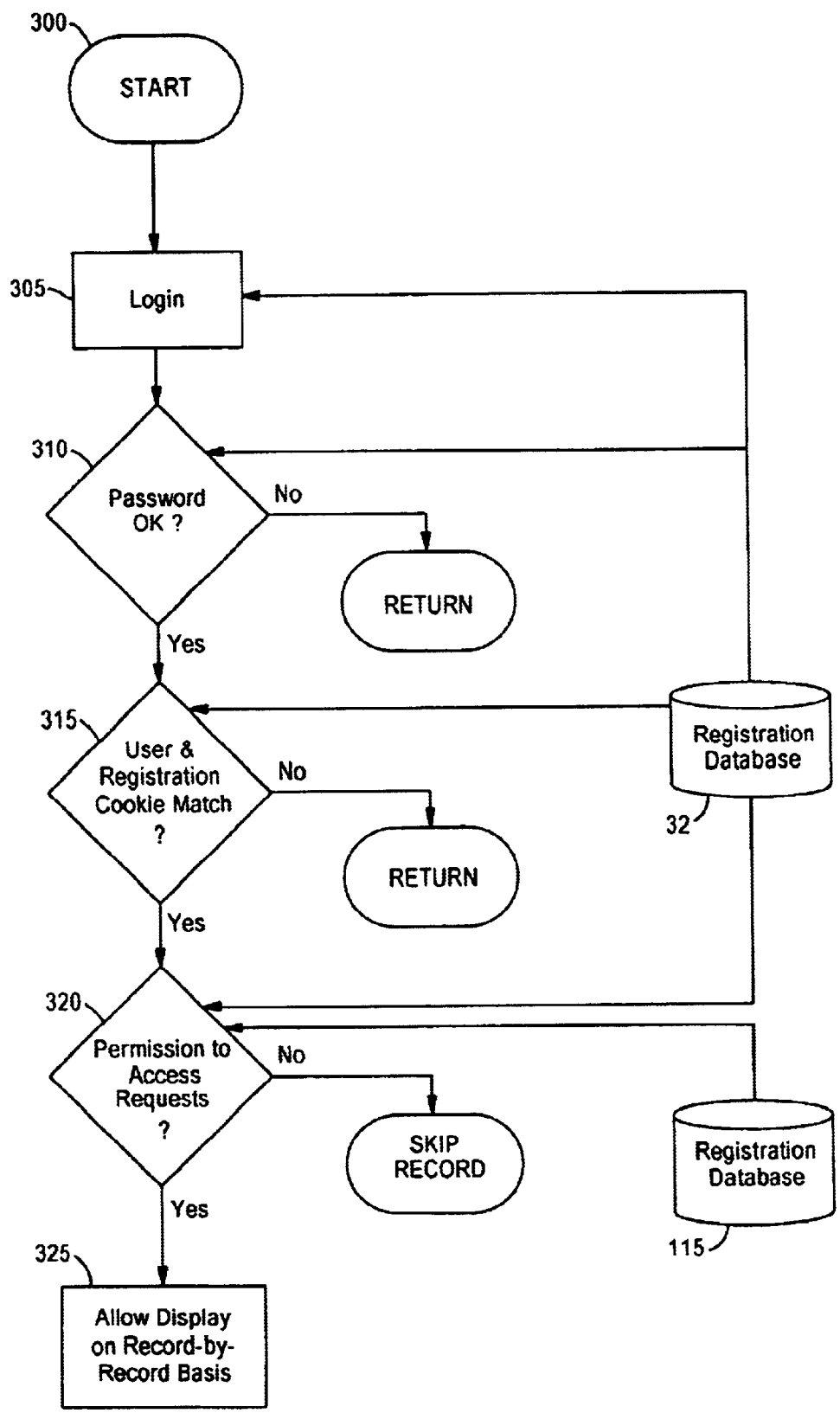
FIG. 9 is a flow chart of the method of operation of the request record display generator according to principles of the present invention.

FIG. 9 (viewed in conjunction with FIG. 5) illustrates in detail the procedures carried out by the bidder security manager 125 (FIG. 5). When a bidder wishes to submit, review, or revise a proposal, the bidder security manager 125 executes the sequence of steps detailed in FIG. 9. The user logs on in step 305 to the system with a unique user identification and a password, which are validated against the registration database 32. If the user identification and password do not match in step 310, those in the registration database 32 the user is sent back to the logon screen to try again for a maximum of four tries before being ejected from the system. The exact number of tries allowed before a user is rejected is immaterial to the claims of the invention. If the user identification and password match those in the registration database 32 the bidder security manager 125 proceeds to the next step. There in step 315, a cookie stored on the user's computer is checked against information stored in the registration database 32. If the cookie does not match in step 315 with that in the registration database 32 the user is rejected and must call the system administrator to negotiate entry into the system. From there the bidder security manager 125 looks up the requisitions to which the bidder is granted access, and then passes only those requisitions and associated information along to the bidder worksheet generator 126, which generates a web page or user interface screen comprising the bidder worksheet 127. The above-described method of the bidder security manager 125 may be eliminated without changing the fundamental nature of the invention.

Figure 10:
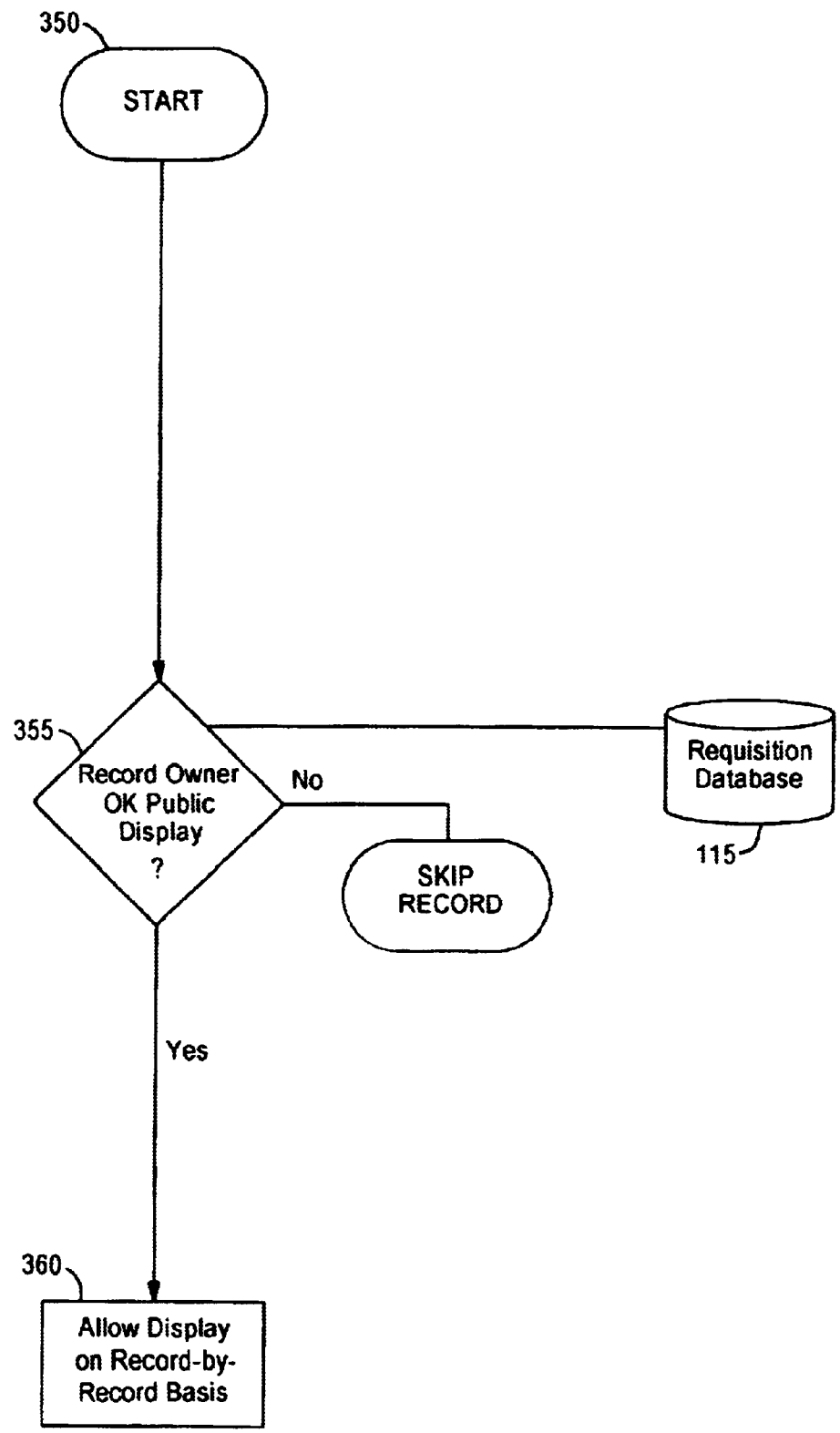
FIG. 10 is a flow chart of the method of operation of the request record display security manager according to principles of the present invention.

FIG. 10 (viewed in conjunction with FIG. 5) illustrates in detail the procedures carried out by the display security manager 131 (FIG. 5). When a requestor or bidder wishes to review the requisitions active in the system without logging on, a restricted set of requisition information is displayed on a dedicated non-interactive user interface controlled by the display security manager 131 which executes the sequence of steps detailed in FIG. 10. The user enters the main menu of the application in step 350. The user uses a button, or equivalent other, to go to the requisition display screen, also triggering the bidder security manager 131 to check each requisition entry in the requisition database 115 to determine if its owner has granted permission to display its information at the public interface, step 355. From there the display security manager 131 looks up the requisitions to which the public is granted access in step 360, and then passes only those requisitions along to the requisition display generator 132, which generates a web page or non-interactive user interface screen comprising the public requisition display 133.

Figure 11:
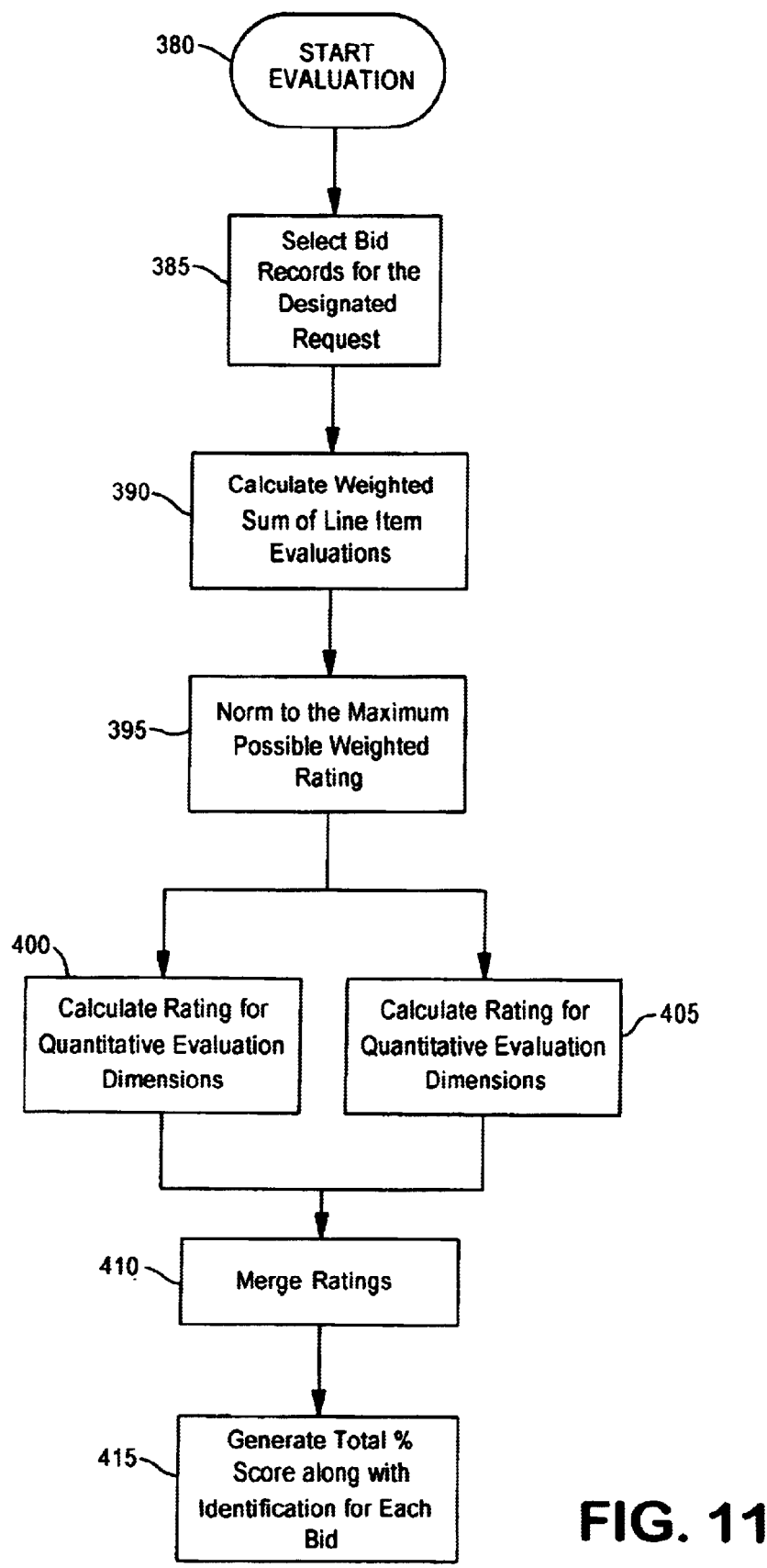
FIG. 11 is a flow diagram of the method of operation of the bid ranking manager according to principles of the present invention.

FIG. 11 (viewed in conjunction with FIG. 5) illustrates in detail the procedures carried out by the bid ranking manager 134 (shown in FIG. 5). This is triggered when a user enters the bidder worksheet or the requestor worksheet. Just prior to such entrance, a specific request is selected and submitted to the bid ranking manager 134 as a parameter so that this request information and the certain information from associated bids can be calculated and/or displayed on the respective worksheets.

The bid ranking manager 134 begins with the selection, step 385, of all bid records for the selected request. This includes, for each of the bids, a merge of the bid cover sheets and their corresponding line item bid entries, including their costs, evaluations and the purchaser-assigned weighting representing the importance of each evaluation dimension toward the total evaluation. In the present embodiment of the invention, in which a relational database is used, the merge is accomplished through the use of a "join" in the database query. The invention may be practiced equally well using other types of databases.

There are then two parts to the evaluation. One is for cost information for which the bidders provide a number which can be used in the evaluation process to calculate other useful numbers and ultimately a final evaluation number, that is therefore inherently quantitative, and for which higher numbers often correspond to lower evaluations. The other is for other dimensions for which the bidders do not directly assign their own numbers, which are therefore not necessarily quantitative, and for which higher requestor assigned numbers may correspond to higher evaluation scores.

The cost information of any bidder is evaluated in relation to the cost information of other bidders. The high bid, the low bid, the average bid, and other statistics are used to calculate a number normalized to a range, for example between 1 and 10, to provide the financial evaluation of the bid. In the currently preferred embodiment, points ranging between the exemplary 1 and 10 are then allocated in accordance with the following formula to each bidder based on its financial offering in its bid.

$$\text{Points}=10-10*\text{Int}[(\text{Bid Cost}-\text{Minimum Cost})(\text{Maximum Cost}-\text{Minimum Cost})]$$

where Minimum Cost is the amount of the lowest bid, Maximum Cost is the amount of the highest bid, and Int is the Integer function. Other substantially equivalent formulas using the same or different computer statistics and variables could be used by those skilled in the art, all of which would be covered under this patent application. Examples of possible formulas include not using the Integer function in the above, using a non-linear measure such as calculation of the percentile of a bid in an assumed normal distribution, or counting the number of standard deviations that the bid was above or below the mean within the total sample of bids. Another alternative formula could be using the preferred simple proportion with added weighting factors to accentuate the point differences among potentially winning bids. Alternatively, the point differences for bids close to the mean could be accentuated. The particular mathematical formula used above in the preferred implementation is proportional to the ratio of the difference between the individual total bid price and the average bid price in the request, and the difference between the maximum and minimum total individual bid prices on the request, all normalized to the range of 1 through 10.

The other, not inherently quantitative evaluations require human judgment in one form or another. This can be done manually at the time of evaluation, or it can be set up in advance so that an algorithm can automatically implement the evaluation. Both manual evaluation and review of the automated evaluation are performed at a user interface to which the requestor/purchaser has privileged access. Automated evaluation is set up in advance by inserting entries in a table. For example, to set up the evaluation of equipment or service quality, the representative of the requestor/purchaser inserts an item record, for each anticipated type of item. The record consists of a string characterizing the possible offering (including such information as a brand name and model, or the name of the service provider and the particular service provided) and a number indicating the number of points to be awarded for bid of that particular product or service. When the automated evaluation algorithm runs, it matches the actual bid item inserted by the bidder with these entries, and then assigns the corresponding points to the evaluation of that line item in the bid.

In the preferred embodiment the result is a series of data base records, one for each bid item for each one or more bids submitted by each one or more bidders for an individual request. Each one of these records has one or more evaluations, each corresponding to the set of evaluation dimensions. In another table populated through a separate user interface and stored in a separate file in the requisition database 115, the requestor has entered a request record which identifies each of these same evaluation dimensions along with how heavily it should be weighted in selecting a winning bid. The request record has an ID number identifying the request, an evaluation category (such as price, service, warranty, configuration, installation, availability, delivery and other characteristics). The request record also includes a numerical weight that the owner of that request gives to each of the relevant evaluation categories. For example, the weight could be in the range between 1 and 10. In the present embodiment, a category that is not used is not included in the record, however, in an alternative embodiment of the invention, the unused category's weight could be set to zero instead. The information from these two tables is then merged in a weighted sum that represents the total number of points earned by a particular bid. The formula for this weighted sum is:

$$\text{WeightedEval}=\text{Sum}([\text{price\_eval}]*[\text{DimensionWeight}]),$$

and for the maximum possible weighted sum is:

$$\text{MaxWeightedEval}=\text{Sum}(10*[\text{DimensionWeight}])$$

where price_eval is the evaluation figure given to the bid item, DimensionWeight is the weighting the requestor has assigned as the importance of the particular evaluation dimension, and the sum ranges over the complete set of items for each bid and is tallied separately for each bid.

In the preferred embodiment these sums are broken apart into separate sums, one for inherently quantitative bid items, the second for the other bid items. Now these two evaluation numbers are re-integrated. Thus, the bid ranking manager 134 in step 410 merges the ratings into a single rating taking into consideration the number of inherently quantitative dimensions (such as cost in dollars) and the number of other dimensions, which are evaluated either by computerized matching or manually by human intervention. Manual and automatic evaluation produce equivalent results. In the present embodiment of the invention, the requestor/purchaser has the option to review the results of the automated evaluations and manually to update them, although either the review or the manual update capability or both could readily be turned off to prevent human intervention should such be regarded as desirable. That is, in the preferred embodiment the requestor has an option to override the automated evaluation with a manual evaluation. In step 415, the bid ranking manager 134 assembles the combined rating.

$$\text{RatioGoodness}=([\text{CountOfCostCategories}]*[\text{CostPoints}]+[\text{CountOfOtherCategories}]*[\text{WeightedEval}])/(([\text{CountOfCostCategories}]+[\text{CountOfOtherCategories}])*[\text{MaxWeightedEval}])=$$
$$[\text{CostPts}]+[\text{CountOfW\_Category}]*[\text{WeightedEval}])/(([\text{CountOfW\_Category}]+1)*[\text{MaxWeightedEval}]),$$

where CountOfCostCategories and CountOfOtherCategories represent the total number of evaluation categories of the specified type, CostPoints and WeightedEval represent the weighted evaluation sums for all cost categories and all other categories respectively, MaxWeightedEval represents the maximum weighted evaluation that could be attained for the perfect bid, and the final equality is for the case that there is only the total cost of the bid offer that contributes quantitative points. In this step, it also attaches information about each bid such as the entity submitting the bid, such entity's assignment of a status to the bid (such as "best and final"), and the date of the bid, into a format ready for use by the bidder security manager 125 and the bidder worksheet generator 126.

By pressing the add new bid hot spot in the bid cover sheet in FIG. 12a and 12b, the prospective supplier is presented with a form for creating a bid cover sheet such as the one shown in FIG. 13. The prospective supplier fills out the required information in the bid cover sheet form and presses the "Submit" button to send the cover sheet information to the electronic auction system for processing. By returning to an intervening menu screen and pressing the new bid line item hot spot, the prospective supplier is presented with a form for creating one out of an indefinite number of line items for the bid, such as the form shown in FIG. 14. The prospective supplier fills out the required information in the bid line item form and presses "Submit" button to send the line item information to the electronic auction system for processing. Other screen designs and equivalent means for submitting a proposal could be used, as understood by those skilled in the art to which the present invention pertains.

Other equivalent means using the same or different computer languages and tools for performing these functions could be used, as understood by those skilled in the art to which the present invention pertains. Certain very limited special purpose user interfaces, such as the interface for the auction administrator to enter the system and change users' cookies, are considered part of the invention and are not explicitly delineated in this disclosure as they would be readily created by those skilled in the art to which the present invention pertains.

In alternative embodiments of the present invention, preference for bids may be determined by exogenous dimensions such as time of submission or geographical distance from the point of delivery, or some other combination of all the above evaluation dimensions.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A computer-implemented method for conducting a reverse auction, comprising the steps of:

receiving request data for a requested item at a first receive interface, the request data including an item description and bid evaluation information, the bid evaluation data including a price and at least one other item evaluation dimension for the requested item, the bid evaluation data further including a weight for each item evaluation dimension;

storing the request data in a requisition database;

receiving bid data at a second receive interface, the bid data generated in response to the request data, the bid data including bid item information generated in response to the item description of the requested item and bid evaluation information;

storing the bid data in a bid database;

evaluating the bid data by a bid evaluator to determine a value of the bid data based on the bid evaluation information including the price and the least one other item evaluation dimension according to the weight for each item evaluation dimension;

determining an auction close; and, determining at least one winning bid in response to said value at auction close.

2. The method of claim 1, further comprising the step of:

rating the quality of an item offered in the request data by comparing the item with data stored in an evaluation database.

3. The method of claim 1, further comprising the step of:

providing auction status information to auction participants.

4. The method of claim 1 further comprising:

validating the request data by a requisition validator.

5. The method of claim 4 wherein the request data validating step further comprises:

looking up a requestor identified in the request data in a registration database, and rejecting the request data if no match is found;

looking up a submitter identified in the request data in the registration database and rejecting the request data if no submitter match is found;

verifying the status of the requisition and rejecting the request data if no status is found;

verifying the datatypes in the request data and rejecting the data if an error is found.

6. The method of claim 5 further comprising:

generating a unique identification number for a validated requisition.

7. The method of claim 1 further comprising:

validating the bid data by a proposal validator.

8. The method of claim 7 wherein the bid data validating step further comprises:

looking up a supplier in a registration database, and rejecting the bid data if no match is found;

looking up a submitter in the registration database and rejecting the bid data if no match is found;

verifying that a requisition addressed by the bid data exists and rejecting the bid data is no requisition is found in the requisition database; and, verifying the datatypes in the bid data and rejecting the bid data if an error is found.

9. The method of claim 8 further comprising:

generating a unique identification number for a validated bid.

10. The method of claim 1 wherein the bid data is received from a plurality of bidders resulting in a plurality of bids.

11. The method of claim 10 wherein the method of evaluating the bid data further comprises the steps of:

calculating a weighted sum of line item evaluations for each bid for an active requisition;

normalizing each weighted sum to a maximum possible weighted rating;

calculating a normed rating for each quantitative evaluation dimension;

calculating a normed rating for each qualitative evaluation dimension; and, merging the maximum possible weighted rated, the quantitative evaluation dimension normed rating, and the qualitative evaluation dimension normed rating into a single bid rating for each bid.

12. The method of claim 1 wherein the requisition database and the bid database are contained in one database.

13. The method of claim 1 wherein the first receive interface and the second receive interface are contained in one interface.

14. The method of claim 1 wherein the first receive interface is a Web user interface.

15. The method of claim 1 wherein the first receive interface is a database user interface.

16. The method of claim 1 wherein the first receive interface is database import facility.

17. The method of claim 1 wherein the second receive interface is a Web user interface.

18. The method of claim 1 wherein the second receive interface is a database user interface.

19. The method of claim 1 wherein the second receive interface is a database import facility.

20. A system for conducting a reverse auction over a computer network, comprising:

means for receiving a request for an item including bid evaluation information over the computer network from a requestor, the bid evaluation information including a price and at least one other evaluation dimension, the bid evaluation information further including a weight for each evaluation dimension;

means for storing the request;

means for receiving at least one bid over the computer network from at least one bidder in response to the request, the bid including bid items and a description of the bid items in response to the bid evaluation information;

means for storing the at least one bid;

means for evaluating the bid based upon at least the bid evaluation information including the price and at least one other evaluation dimension according to the weight for each evaluation dimension;

means for providing the current auction status information to the requestor and to the at least one bidder;

means for the requestor to alter the request;

means for each bidder to alter that bidder's associated bid;

means for determining the auction close in response to information in the request; and means for determining a winning bid using at least the bid evaluation information included in the request at the auction close, whereby a requestor can submit an item and a bidder can bid on the item over the computer network.

21. A computer system for conducting a reverse auction, comprising:

a database system for storing bids, requests, and data about bidders and requestors, including bid evaluation information, the bid evaluation information including a price and at least one other evaluation dimension, the bid evaluation information further including a weight for each evaluation dimension;

an auction store for storing best bid criteria, auction status information, and auction templates to present to users and requestors together with the bid evaluation information; and an auction processor connected to said database system and said auction store, said auction processor for processing bids and requests together with the bid evaluation information, said auction processor providing auction status information in response to bids and requests, said auction processor determining a best bid using the bid evaluation information including the price and the at least one other evaluation dimension according to the weight for each evaluation dimension, the stored best bid criteria and input bids and requests.

22. The method of claim 1 wherein the step of evaluating bid data further comprises:

matching descriptions of goods and services with entries in an evaluation database; and rating quality of said goods and services in response to said matching step.

23. The method of claim 1 wherein the step of evaluating bid data further comprises providing quantitative numerical evaluations of non-numerical attributes provided in bids.

24. A computer-implemented method for conducting a reverse auction, comprising the steps of:

receiving request data for a requested item at a first receive interface, the request data including an item description and bid evaluation information, the bid evaluation data including a price and at least one other evaluation dimension for the requested item, the bid evaluation data further including a weight for each evaluation dimension;

storing the request data in a requisition database;

receiving bid data for a plurality of bid items at a second receive interface, the bid data generated in response to the request data;

storing the bid data for the plurality of bid items in a bid database;

determining a value of each bid item based on the bid evaluation information including the price and the at least one other evaluation dimension according to the weight for each evaluation dimension;

comparing the value of each bid item with the bid evaluation information to provide each bid item with a bid item rank;

determining an auction close; and determining at least one winning bid from the bid item rank of each of the plurality of bid items at auction close.

* * * * *

UNITED STATES PATENT AND TRADEMARK OFFICE
CERTIFICATE OF CORRECTION

| | | |
|---|---|---|
| PATENT NO. | : 6,647,373 B1 | Page 1 of 1 |
| APPLICATION NO. | : 09/332321 | |
| DATED | : November 11, 2003 | |
| INVENTOR(S) | : John Carlton-Foss | |

It is certified that error appears in the above-identified patent and that said Letters Patent is hereby corrected as shown below:

On the Title page, Item (60) under Related U.S. Application Data, the filing date of the provisional application should read -- Dec. 24, 1998 -- and not "Dec. 27, 1998."

Signed and Sealed this

Thirty-first Day of January, 2012

David J. Kappos
*Director of the United States Patent and Trademark Office*